Jan. 22, 1924. 1,481,716
H. R. KETCHUM
COMBINED CLINOMETER, PLUMB, AND LEVEL
Filed Sept. 12, 1921
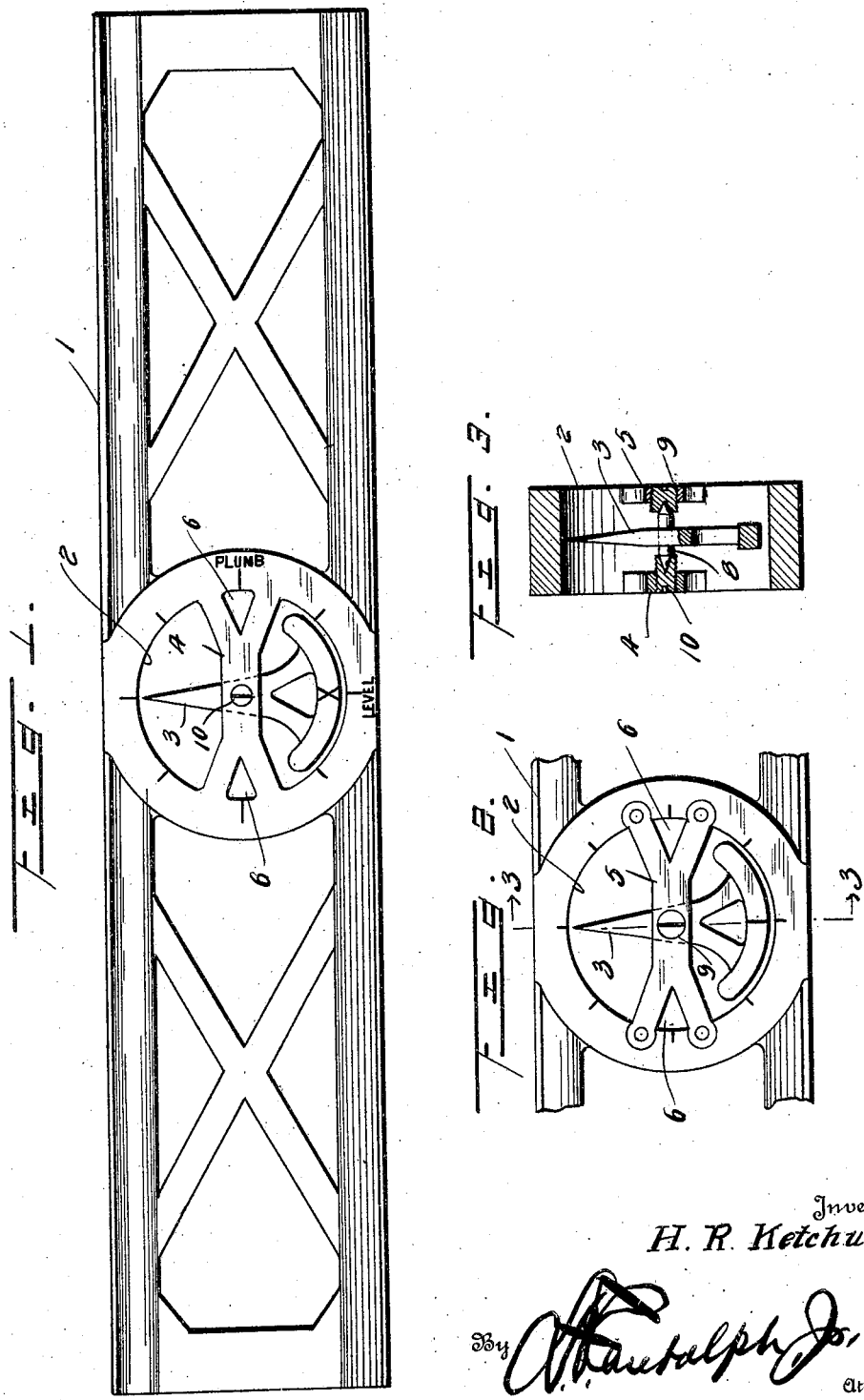
Inventor
H. R. Ketchum.
By
Attorney Patented Jan. 22, 1924.

1,481,716

UNITED STATES PATENT OFFICE.

HARRY R. KETCHUM, OF TIPLER, WISCONSIN, ASSIGNOR OF ONE-THIRD TO JAMES W. PINCH, OF TIPLER, WISCONSIN.

COMBINED CLINOMETER, PLUMB, AND LEVEL.

Application filed September 12, 1921. Serial No. 500,077.

*To all whom it may concern:*

Be it known that I, HARRY R. KETCHUM, a citizen of the United States, residing at Tipler, in the county of Florence and State of Wisconsin, have invented certain new and useful Improvements in a Combined Clinometer, Plumb, and Level; and I do hereby declare the following to be a full, clear, and exact description of the invention, such as will enable others skilled in the art to which it appertains to make and use the same.

This invention provides an instrument which admits of determining the vertical, the horizontal, or any intermediate angle and which embodies a frame and a delicately poised pointer weighted at its lower end so as to occupy a vertical position under all conditions so long as its axis is horizontal and free, said frame embodying a circular calibration for cooperation with the pointer to accurately indicate the inclination of the surface against which the instrument may be placed.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a side view of an instrument embodying the invention.

Figure 2 is a detail view of the reverse side, and

Figure 3 is a transverse section on the line 3—3 of Figure 2.

Corresponding and like parts are referred to in the following description and designated in the several views of the drawing by like reference characters.

The instrument comprises a frame 1 which may be of any formation but which in the preferred construction is of cast metal such as steel or malleable iron. As indicated the frame is elongated and comprises spaced parallel longitudinal bars and an intermediate latticed or open work connection thereby resulting in the provision of a frame which is durable, neat, light and strong. The central portion of the frame 1 is provided with a ring 2 to afford a circular opening which receives a delicately poised pointer 3 weighted at its lower end so as to always occupy a vertical position. The ring 2 is provided with suitable calibrations for cooperation with the pointer 3 to accurately indicate the relative direction of the surface against which the instrument may be placed. The pointer 3 is disposed wholly within the ring 2 so as to be protected from possible injury.

Longitudinal arms 4 and 5 are located at opposite sides of the frame 1 and are spaced apart to receive the pointer 3. One of the arms 4 is preferably formed integral with the frame 1 whereas the other bar 5 is detachable whereby to provide for placing the pointer in position or removing the same, as required. The outer sides of the arms 4 and 5 are flush with the respective sides of the frame 1 and their opposite ends are forked to form spaces 6 whereby to facilitate the reading when the instrument is used as a plumb. Any suitable fastening means may be employed for securing the detachable arm 5 when in position, machine screws being preferred.

The pointer 3 is provided with a shaft 8 which constitutes an axis or pivot support therefor. The ends of the shaft 8 are conical and seat in bearings in a plug 9 and screw 10 which are threaded in the respective arms 4 and 5 and have conical recesses in their inner ends to receive the conical ends of the shaft 8. In this manner the pointer 3 is delicately poised so as to move with the greatest freedom and with a minimum amount of resistance. The parts 9 and 10 may be adjusted to obtain a neat fit with the trunnions of the pointer to obviate any possible lost motion and prevent any binding.

The instrument is strong and durable and embodies parts which are not liable to become broken or displaced and the instrument is such as to admit of accurately measuring slope or pitch as well as determining the vertical or horizontal.

Having thus described the invention, what I claim is:—

An instrument of the class described consisting of spaced parallel longitudinal bars, a lattice work connection between and integral with the bars and including a ring, said ring being of substantially the same width as said bars, the ring and bars coinciding at substantially diametrically opposite points of the ring, the ring having an arm spanning and integral with it at one of its sides and connected therewith at substantially diametrically opposite points, a second arm disposed at the opposite side of the ring and connected therewith at substantially diametrically opposite points, the second arm being detachably secured to the ring, an indicator intermediate the arms and protected thereby, trunnions extending outwardly from the indicator, and plugs screw threaded in said arms to constitute bearings for said trunnions.

In testimony whereof I affix my signature in presence of two witnesses.

HARRY R. KETCHUM.

Witnesses:
J. W. PINCH,
WILLIAM PETERSON.